(12) United States Patent
Takematsu

(10) Patent No.: US 8,098,394 B2
(45) Date of Patent: Jan. 17, 2012

(54) IMAGE PROCESSING CIRCUIT AND PRINTING APPARATUS

(75) Inventor: Kanji Takematsu, Suwa (JP)

(73) Assignee: Seiko Epson Corporation, Tokyo (JP)

(*) Notice: Subject to any disclaimer, the term of this patent is extended or adjusted under 35 U.S.C. 154(b) by 1194 days.

(21) Appl. No.: 11/837,069

(22) Filed: Aug. 10, 2007

(65) Prior Publication Data

US 2008/0080005 A1    Apr. 3, 2008

(30) Foreign Application Priority Data

Aug. 10, 2006  (JP) .............................. 2006-218219

(51) Int. Cl.
 *G06K 15/00*  (2006.01)
 *H04N 1/405* (2006.01)
 *H04N 1/60*  (2006.01)

(52) U.S. Cl. ..................... 358/1.17; 358/3.14; 358/3.06; 358/3.07; 358/3.17; 358/1.9

(58) Field of Classification Search ........ 358/1.11–1.18, 358/1.9, 3.06–3.22, 534–536; 382/237, 270; 345/596–599
See application file for complete search history.

(56) References Cited

U.S. PATENT DOCUMENTS

| | | | | |
|---|---|---|---|---|
| 5,774,229 A * | 6/1998 | Delabastita | ................. | 358/3.07 |
| 5,808,755 A * | 9/1998 | Delabastita | ................. | 358/3.17 |
| 5,828,463 A * | 10/1998 | Delabastita | ................. | 358/3.17 |
| 5,982,508 A | 11/1999 | Kashihara | | |
| 7,660,017 B2 * | 2/2010 | Karito | ......................... | 358/3.14 |
| 2007/0008585 A1* | 1/2007 | Karito | ......................... | 358/3.06 |
| 2008/0204777 A1* | 8/2008 | Takematsu | ..................... | 358/1.9 |

FOREIGN PATENT DOCUMENTS

| JP | 08-317210 A | 11/1996 |
|---|---|---|
| JP | 200625220 A | 1/2006 |
| JP | 2007-188284 A | 7/2007 |

* cited by examiner

*Primary Examiner* — Mark K Zimmerman
*Assistant Examiner* — Satwant Singh
(74) *Attorney, Agent, or Firm* — Sughrue Mion, PLLC

(57) ABSTRACT

Object image data of a processing object image, which virtually has cells each including a set of M×N pixels, is processed. The cells are arranged in steps and are shifted by Dx pixels and by Dy pixels. An input raster buffer stores (N−1) raster data including pixel values of the processing object image. A data updating circuit updates the raster with inputted pixel values. Cell buffers store M×N pixel values regarding one of the cells. Processing circuits output partial data for the processed image data by ubmining a center of gravity position of gradation values in the one of the cells from the M×N pixel values, A control circuit controls storing pixel values regarding each of cells in k-th step using the raster data inputted and the raster data stored when "k•(N−1)+1"-th raster data is inputted to the data updating circuit.

10 Claims, 7 Drawing Sheets

IMAGE PROCESSING CIRCUIT AND PRINTING APPARATUS

The disclosure of Japanese Patent Application No. 2006-218219 filed Aug. 10, 2006 including specification, drawings and claims is incorporated herein by reference in its entirety.

BACKGROUND

The present invention relates to an image processing circuit and a printing apparatus.

Generally, an usual electrophotographic printing apparatus (a printing apparatus such as a printer and a multi-function printer for performing a print operation) executes a screen process of referring to index values for every one pixel unit while searching the pixels in a raster direction, and of obtaining output gradation values from a gamma table and input gradation values corresponding to the index values, with respect to image data (image data generated by CPU on the basis of image data and data sent from PC) to be processed at the time of printing. Since the screen processes having the same contents as described above is easily embodied as hardware, the usual electrophotographic printing apparatus is also configured as an apparatus (an apparatus in which the screen process is executed not by CPU but by an image processing circuit) in which an image processing circuit for executing the screen process is equipped.

In such a electrophotographic printing apparatus, there is an apparatus (for example, see Japanese Patent Publication No. 2006-25220A) for executing not the screen process having the content as described above but a screen process using a method of generating dot growth from the center of gravity position of a cell while storing the sum total of gradation values of the entire cells, by obtaining the center of gravity position of the gradation value for each pixel unit as shown in FIG. 7, in order to be compatible between gradation capability and high resolution. However, since there has not been developed an image processing circuit capable of executing the aforementioned screen process (hereinafter, it is referred to as an AAM screen process) at a speed without any problem in practical use, the usual printing apparatus is configured as an apparatus in which a CPU having comparatively high performance is equipped, in view of circumstances that the AAM screen process is executed in the CPU.

SUMMARY

It is therefore an object to provide an image processing circuit that is able to execute screen processes (which includes a process for obtaining the center of gravity position of gradation in cells) such as the AAM screen process at a speed without any problem in practical use and a printing apparatus capable of being manufactured without employing a CPU of high performance.

In order to achieve the above object, according to a first aspect of the invention, there is provided a n image processing circuit for generating processed image data from processing object image data indicative of a processing object image which virtually has a plurality of cells each of which includes a set of M×N pixels in which M pixels are arranged in the X direction and N pixels are arranged in Y direction, the cells are arranged in a plurality of steps and are shifted each other by Dx pixels in the X direction (where Dx is equal to or greater than 1 and equal to or less than M) and by Dy pixels in the Y direction (where Dy is equal to or greater than 1 and equal to or less than N), the image processing circuit comprising:

an input raster buffer operable to store (N−1) raster data each of which includes pixel values regarding pixels aligned on one line in the X direction in the processing object image;

a data updating circuit to which each of the pixel values included in the raster data is sequentially inputted, the data updating circuit operable to update the raster data in the input raster buffer so as to sequentially replace each of the pixel values in the oldest stored raster data by each of the inputted pixel values;

a plurality of cell buffers, each of which is operable to store M×N pixel values regarding one of the cells;

a plurality of screen processing circuits, each of which is operable to generate and output partial data for the processed image data by executing a predetermined process for obtaining a center of gravity position of gradation values in the one of the cells from the M×N pixel values stored in one of the cell buffers; and a control circuit operable to execute a control process for sequentially storing pixel values regarding each of cells in k-th step into one of the cell buffers based on the raster data inputted in the data updating circuit and the raster data stored in the input raster buffer when "k·(N−1)+1"-th raster data is inputted to the data updating circuit.

According to a second aspect of the invention, there is provided an image processing circuit for generating processed image data from processing object image data indicative of a processing object image which virtually has a plurality of cells each of which includes a set of M×N pixels in which M pixels are arranged in the X direction and N pixels are arranged in Y direction, the cells are arranged in a plurality of steps and are shifted each other by Dx pixels in the X direction (where Dx is equal to or greater than 1 and equal to or less than M) and by (N−1) pixels in the Y direction, the image processing circuit comprising:

an input raster buffer operable to store (N−1) raster data each of which includes pixel values regarding pixels aligned on one line in the X direction in the processing object image;

a data updating circuit to which each of the pixel values included in the raster data is sequentially inputted, the data updating circuit operable to update the raster data in the input raster buffer so as to sequentially replace each of the pixel values in the oldest stored raster data by each of the inputted pixel values;

(N−1) cell buffers, each of which is operable to store M×N pixel values regarding one of the cells;

(N−1) screen processing circuits, each of which is operable to generate and output partial data for the processed image data by executing a predetermined process for obtaining a center of gravity position of gradation values in the one of the cells from the M×N pixel values stored in one of the (N−1) cell buffers; and a control circuit operable to execute a control process for sequentially storing pixel values regarding each of cells in k-th step into one of the (N−1) cell buffers based on the raster data inputted in the data updating circuit and the raster data stored in the input raster buffer when "k·(N−1)+1"-th raster data is inputted to the data updating circuit.

That is, in the image processing circuit in which a program for the AAM screen process in the condition where heights of the cell is 5 (which corresponds to N in the invention) and a vertical shift amount of the cell is 4 (=N·1) is simply embodied as hardware, a process of calculating for each cell in a first step is executed in the process of inputting a fifth raster data (which corresponds to "k·(N−1)+1"-th raster data in the case of k=1), and only a process of storing each raster data is executed in the process of inputting sixth to eighth raster data, and then the same processes are repeated. Accordingly, such an image processing circuit should supply the raster data at a speed depending on the completion time of a calculation process for each cell. In the AAM screen process, since the calculation process takes much time (comparatively, the large number of clock cycles for completing the process is required), the image processing circuit in which the program for the AAM screen process is simply embodied as hardware cannot supply the raster data at a normal speed. However, in the image processing circuit according to the first and second aspects of the invention, the calculation process is executed for each cell so as to distribute the processes to a plurality of screen processing circuits, that is, first to (N−1)-th screen processing circuits when inputting "k·(N−1)+1"-th raster data. As a result, the image processing circuit according to the first and second aspects of the invention is configured as a circuit capable of executing a screen processes (i.e. the processes including a process for calculating the center of gravity position of gradation in cells) such as the AAM screen process at a speed without any problem in practical use.

As for a control circuit of the image processing circuit according to the second aspect of the invention, it is possible to employ various forms. For example, the control process may include a process for storing pixel values regarding respective cells which include an L-th cell in the order of the X direction arranged into the L-th cell buffer (L=1 to N−1) and arranged at intervals of (N−2) cells in the X direction.

According to a third aspect of the invention, there is provided an image processing circuit for generating processed image data from processing object image data indicative of a processing object image which virtually has a plurality of cells each of which includes a set of M×N pixels in which M pixels are arranged m the X direction and N pixels are arranged in Y direction, the cells are arranged in a plurality of steps and are shifted each other by Dx pixels in the X direction (where Dx is equal to or greater than 1 and equal to or less than M) and by Dy pixels in the Y direction (where Dy is equal to or greater than 1 and equal to or less than (N−1)), the image processing circuit comprising:

an input raster buffer operable to store (N+Dy−2) raster data each of which includes pixel values regarding pixels aligned on one line in the X direction in the processing object image;

a data updating circuit to which each of the pixel values included in the raster data is sequentially inputted, the data updating circuit operable to update the raster data in the input raster buffer so as to sequentially replace each of the pixel values in the oldest stored raster data by each of the inputted pixel values;

a cell buffer operable to store M×N pixel values regarding one of the cells;

a screen processing circuit operable to generate and output partial data for the processed image data by executing a predetermined process for obtaining a center of gravity position of gradation values in the one of the cells from the M×N pixel values stored in the cell buffer;

a control circuit operable to execute during a time period between a time when "k·(N−1)+1"-th raster data is inputted into the data updating circuit and a time when "k·(N−1)+1"-th raster data is inputted into the data updating circuit, a first control process for storing pixel values regarding some of cells in k-th step into the cell buffer based on the raster data inputted in the data updating circuit and the "(k−1)·(N−1)+1"-th raster data to "k·(N−1)"-th raster data stored in the input raster buffer, and a second control process for storing pixel values regarding the other of the cells in the k-th step into the cell buffer based on only the "(k−1)·(N−1)+1"-th raster data to "(k·(N−1)+1"-th raster data.

According to a fourth aspect of the invention, there is provided an image processing circuit for generating processed image data from processing object image data indicative of a processing object image which virtually has a plurality of cells each of which includes a set of M×N pixels in which M pixels are arranged in the X direction and N pixels are arranged in Y direction, the cells are arranged in a plurality of steps and are shifted each other by Dx pixels in the X direction (where Dx is equal to or greater than 1 and equal to or less than M) and by (N−1) pixels in the Y direction, the image processing circuit comprising:

an input raster buffer operable to store (2N−3) raster data each of which includes pixel values regarding pixels aligned on one line in the X direction in the processing object image;

a data updating circuit to which each of the pixel values included in the raster data is sequentially inputted, the data updating circuit operable to update the raster data in the input raster buffer so as to sequentially replace each of the pixel values in the oldest stored raster data by each of the inputted pixel values;

a cell buffer operable to store M×N pixel values regarding one of the cells;

a screen processing circuit operable to generate and output partial data for the processed image data by executing a predetermined process for obtaining a center of gravity position of gradation values in the one of the cells from the M×N pixel values stored in the cell buffer;

a control circuit operable to execute a first control process for storing pixel values regarding respective cells in k-th step, which are arranged at intervals of (N−2) cells in the X direction into the cell buffer based on the raster data inputted into the data updating circuit and the "(k−1)·(N−1)+1"-th raster data to "k·(N−1)"-th raster data stored in the input raster buffer in a case where "k·(N−1)+1"-th raster data is inputted into the data updating circuit, and a second control process for storing pixel values regarding the other respective cells in the k-th step into the cell buffer based on only "(k−1)·(N−1)+1"-th raster data to "k·(N−1)+1"-th raster data stored in the input raster buffer in a case where "k·(N−1)+2"-th raster data to "k·(N−1)+N−1"-th raster data are inputted into the data updating circuit.

That is, instead of having a plurality of screen processing circuits, the image processing circuit according to the third and fourth aspects of the invention has the input raster buffer and the like capable of storing much more raster data. Hence, the image processing circuit is configured as a circuit operable to execute calculation processes for cells in a k-th step, even when inputting "k·(N−1)+2"-th to "k·(N−1)+N−1"-th raster data. As a result, the image processing circuit according to the third and fourth aspects of the invention is also configured as a circuit capable of executing a screen processes (i.e. the processes including a process for calculating the center of gravity position of gradation in cells) such as the AAM screen process at a speed without any problem in practical use.

As for a control circuit of the image processing circuit according to the fourth aspect of the invention, it is possible to employ various forms. For example, the first control process executed by the control circuit may include a process for storing the pixel values for respective cells including a first cell in the order of the X direction into the cell buffer, and the second control process executed by the control circuit may include a process for storing the pixel values for respective cells including a L-th cell in the order of the X direction into the cell buffer when "k·(N−1)+L"-th raster data (L=2 to N−1) is inputted into the data updating circuit.

According to the invention, there is provided a printing apparatus comprising the aforementioned image processing circuit, and the printing apparatus (in which not a CPU but the image processing circuit performs processes such as the AAM screen process) performs printing based on the processed image data obtained by inputting the processing object image data into the image processing circuit. As a result, the printing apparatus according to invention is configured as an apparatus (capable of being manufactured in low cost) capable of being manufactured without employing a CPU of high performance.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Hereinafter, embodiments of the invention will be described in detail with reference to the drawings.

First Embodiment

Figure 1:
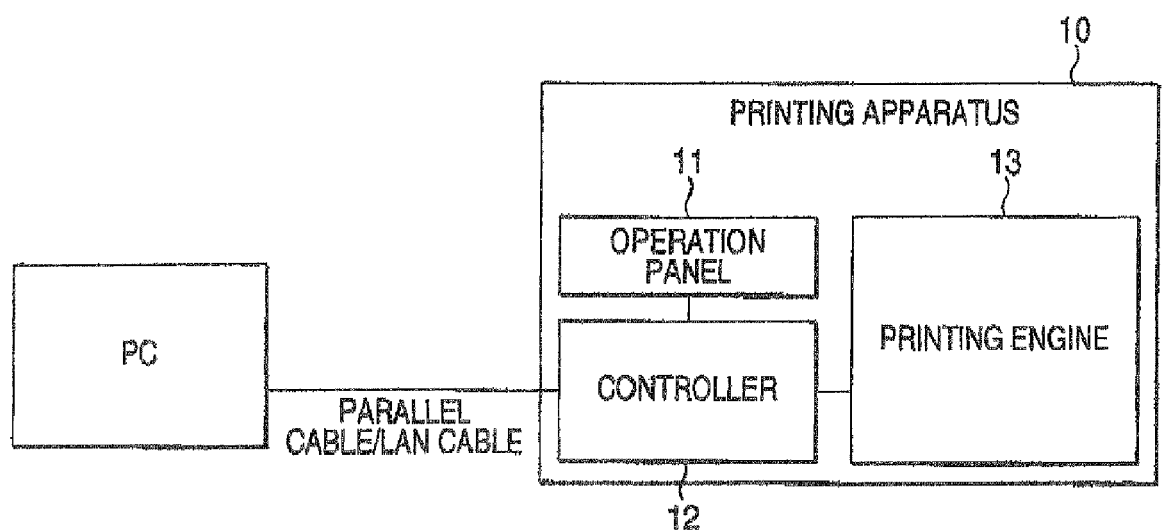
FIG. 1 is a diagram illustrating a configuration of a printing apparatus according to a first embodiment of the invention.

As shown in FIG. 1, a printing apparatus 10 according to a first embodiment of the invention includes an operation panel 11, a controller 12, and a printing engine 13. Additionally, the printing apparatus 10 is configured to connect to a PC in which a printer driver for the apparatus is installed through a parallel cable or a LAN cable.

An operation panel 11 included in the printing apparatus 10 is a unit provided as interface means between the apparatus and a user in the printing apparatus 10. The operation panel 11 includes a LCD, a plurality of LEDs, and a push-button switch.

Figure 2:
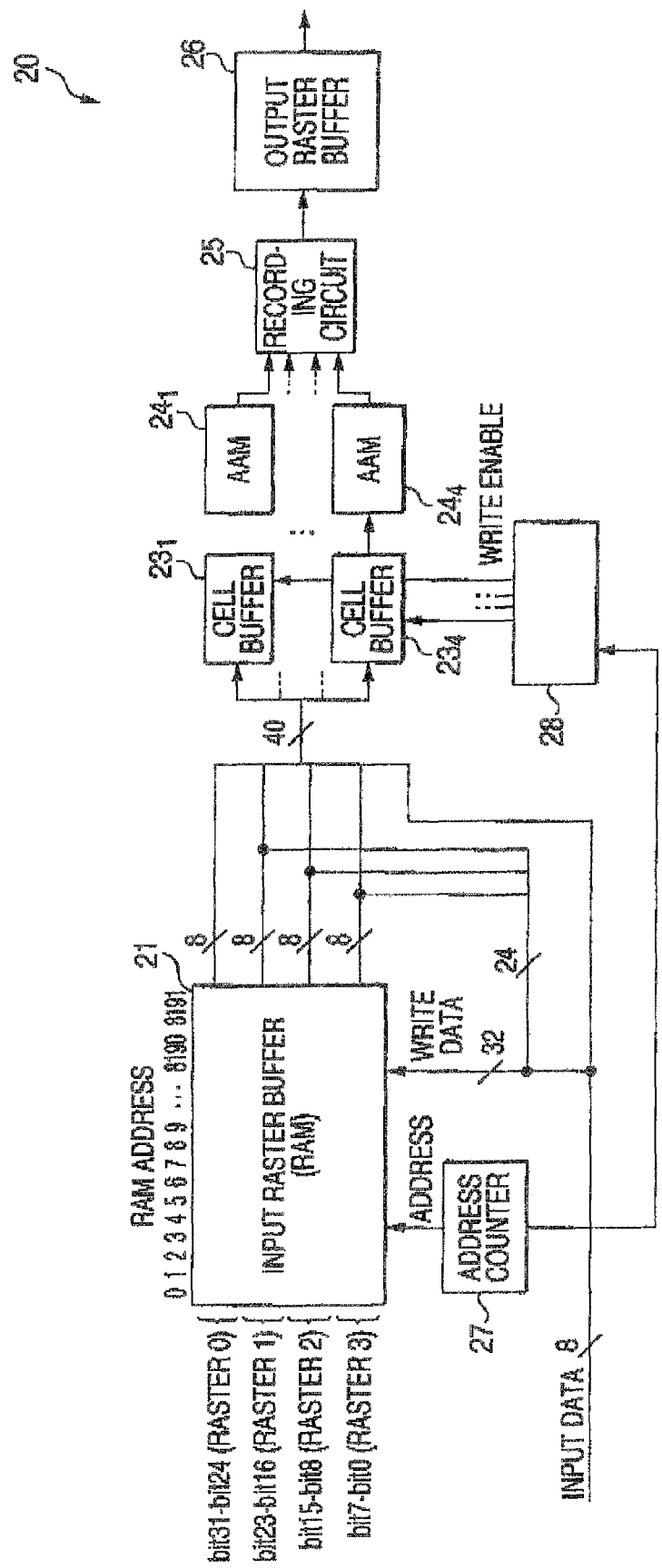
FIG. 2 is a diagram illustrating a configuration of an image processing circuit used in a printing apparatus according to the first embodiment.

A printing engine 13 is a unit for performing an electrophotographic print. A controller 12 is a unit capable of executing processes such as a process that the printing engine 13 performs printing contents based on print data transmitted from the PC. The controller 12 includes an image processing circuit 20 having a configuration illustrated in FIG. 2 for executing an AAM screen process (the AAM screen process in the condition where a cell size is 5×5, which corresponds to N×M in each Claim, and a vertical shift amount of the cell is 4 (=N−1)) illustrated in FIG. 7. The controller 12 is configured as a unit for generating data supplied to the printing engine 13 by using the image processing circuit 20.

An input raster buffer 21 included in the image processing circuit 20 (FIG. 2) is a RAM capable of storing four raster data as shown in the drawing. In the drawing, "raster 0" to "raster 3" represent raster data that is inputted four to one times previous to the current raster data inputted at the current time, respectively.

An address counter 27 is a circuit operable to start a process for sequentially outputting addresses from 0 to 8191 whenever an input of raster data is newly started. As shown in the drawing, in the image processing circuit 20, the addresses outputted from the address counter 27 is used as readout addresses and record addresses for the input raster buffer 21. More specifically, the image processing circuit 20 is operable to periodically shift and record 32-bit data including the data inputted for three times in the past and the data inputted at the current time from the input raster buffer 21 to addresses (the addresses of the data made to be outputted from the input raster buffer 21) determined by the address counter 27. For example, the data (pixel values) previously stored as a component of "raster 3" is stored as a component of "raster 2"—the data previously stored as a component of "raster 2" is stored as a component of "raster 1"—the data previously stored as a component of "raster 1" is stored as a component of "raster 0", and the data currently inputted is stored as a component of "raster 3".

Any of four cell buffers 231 to 234 (in the drawing, only two cell buffers 231 and 234 is illustrated) included in the image processing circuit 20 is a buffer capable of storing N×M (in the embodiment, N=M=5) pixel values (pixel values per one cell).

A cell selection circuit 28 is a circuit operable to be synchronous to the address counter 27. Additionally, the cell selection circuit 28 is a circuit including a counter for managing which number of raster data (the head of raster data is a first raster data) is being processed. The cell selection circuit 28 executes a process for controlling (i.e. outputting write enable signals to cell buffers 231 to 234) cell buffers 231 to 234 so that each cell buffer 23L (L=1 to 4) stores the pixel values of each cell which includes a L-th cell in the order of the X direction (an arranged direction of each pixel having the pixel values in the raster data) and which arranged (which selected so that other three cells exist between them) at intervals of three cells (which corresponds to intervals of "N−2" cells in Claim 3) in the X direction, in the process of inputting "4·k+1"-th raster data (which corresponds to "k·(N−1)+1"-th raster data in Claims 1 and 2), on the basis of the counter value.

Figure 3:
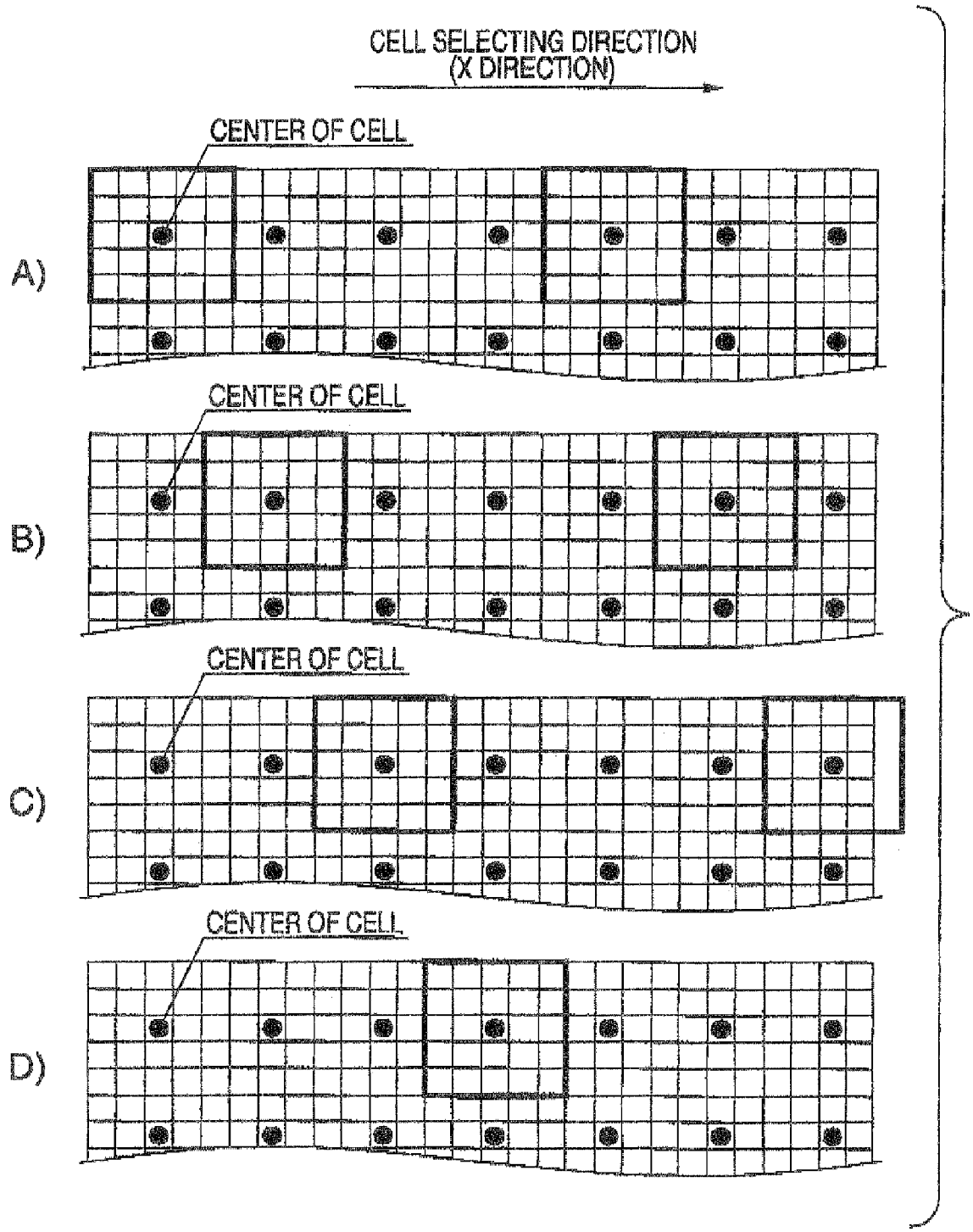
FIG. 3 is a diagram illustrating a function of a cell selection circuit included in the image processing circuit according to the first embodiment.

For example, in the process of inputting fifth raster data (when k=1), the cell selection circuit 28 is operable to store the cell buffer 231 with pixel values of each cell outlined in black in FIG. 3(A), to store the cell buffer 232 with pixel values of each cell outlined in black in FIG. 3(B), to store the cell buffer 233 with pixel values of each cell outlined in black in FIG. 3(c), and to store the cell buffer 234 with pixel values of each cell outlined in black in FIG. 3(D).

Each AAM screen processing circuit 24L (L=1 to 4) included in the image processing circuit 20 (FIG. 2) is a circuit (a circuit for executing the AAM screen process for one cell) operable to generate and output data (which is a part of data outputted by the image processing circuit 20) obtained through the AAM screen process for the current cell, by executing a process for calculating the center of gravity position of a gradation value from M×N pixel values (gradation value) stored in the cell buffer 23L, under control of the cell selection circuit 28.

A recording circuit 25 is operable to record the data outputted from each AAM screen processing circuit 24L into a proper position of an output raster buffer 26. The image processing circuit 20 is configured as a circuit for outputting the data (the data sorted through the recording circuit 25 in the manner of using the output raster buffer 26), which is recorded into the output raster buffer 26 by the recording circuit 25, as a final output.

Figure 4:
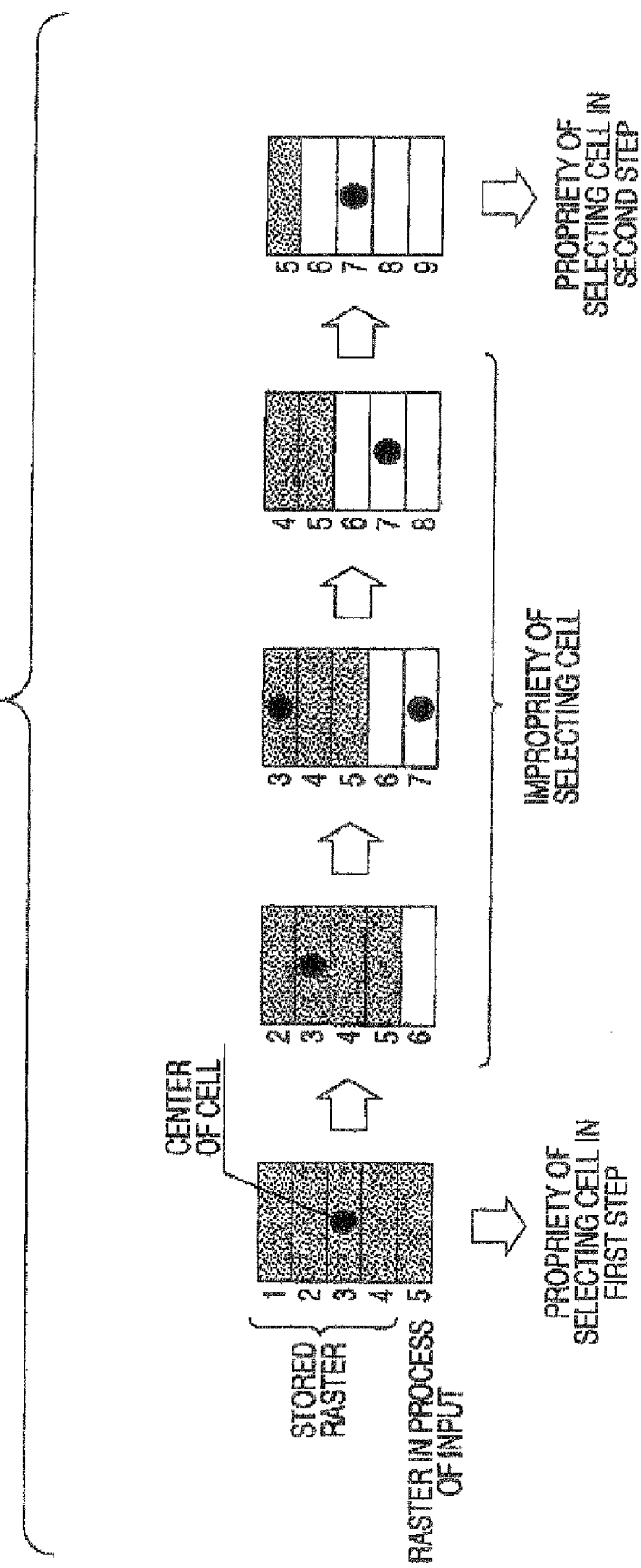
FIG. 4 is a diagram illustrating an operation of the image processing circuit according to the first embodiment.

As described above, the image processing circuit 20 included in the printing apparatus 10 according to the embodiment is configured as a circuit for determining whether the data capable of being subjected to cell selection exist therein, only in the process of inputting the "4·k+1"-th raster data (in the FIG. 4, in the process of inputting fifth raster data, and in the process of inputting ninth raster data), as schematically illustrated in FIG. 4. Here, the image processing circuit 20 is operable to execute calculation processes for each cell in a k-th step so as to distribute the processes to the four AAM screen processing circuits 241 to 244, in the process of inputting the "4·k+1"-th raster data. Hence, it is possible to execute the AAM screen process at a speed without any problem in practical use when using the image processing circuit 20. In the printing apparatus 10 according to the embodiment, the image processing circuit 20 as described above is operable to execute the AAM screen process. Hence, the apparatus can be manufactured so as to be configured without a CPU of high performance.

Second Embodiment

Figure 5:
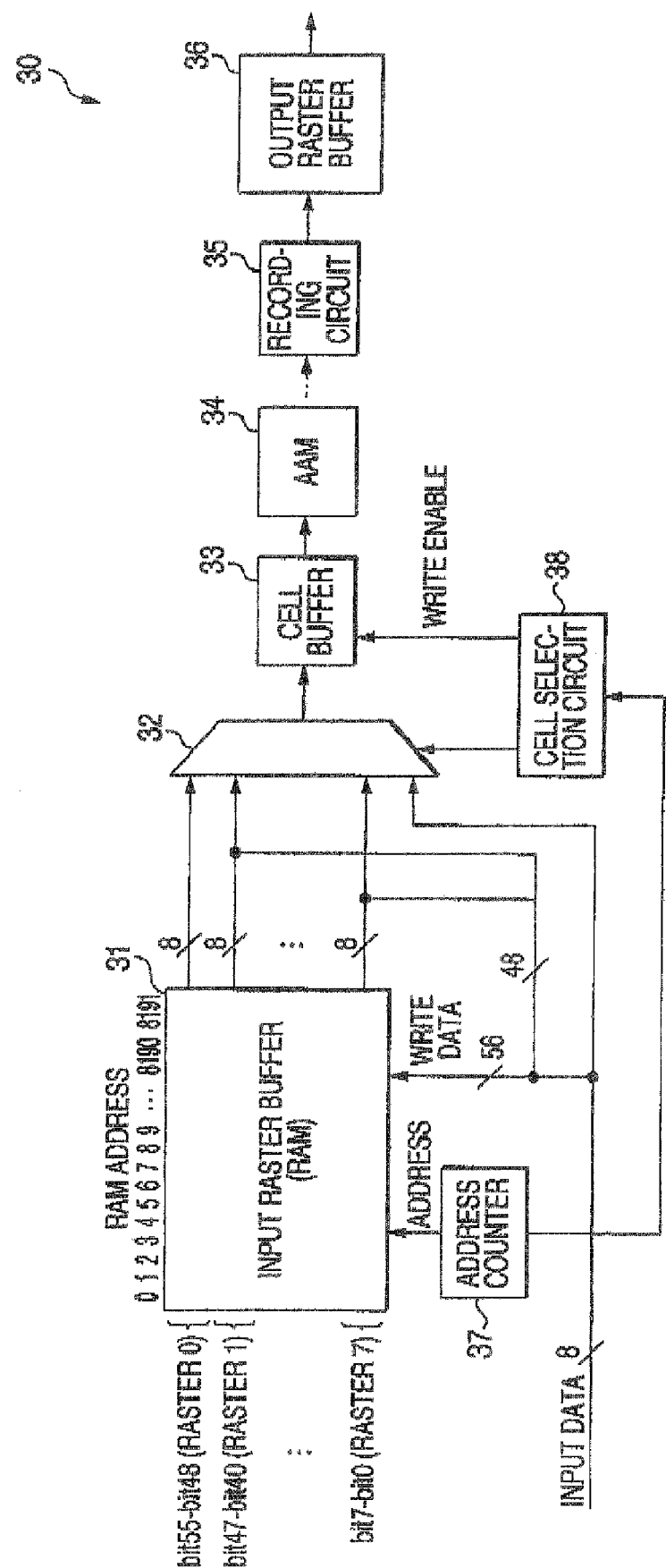
FIG. 5 is a diagram illustrating a configuration of an image processing circuit used in a printing apparatus according to the second embodiment of the invention.
Figure 7:
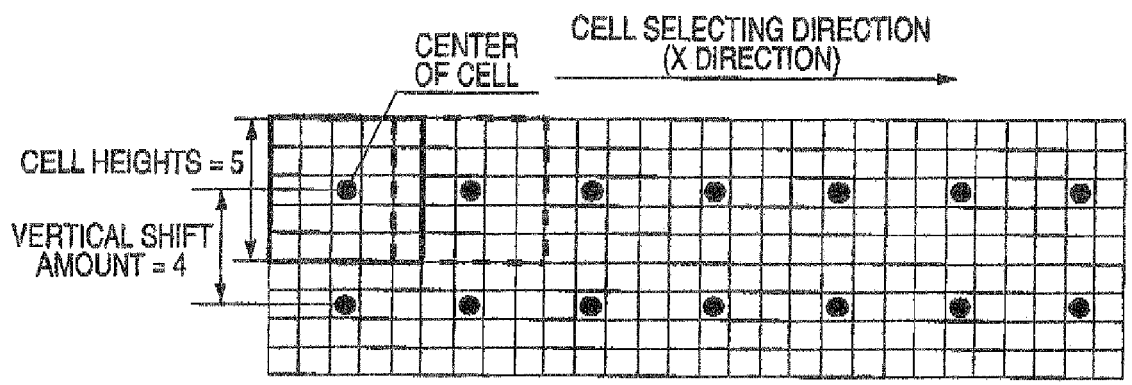
FIG. 7 is a diagram illustrating an AAM screen process.

A printing apparatus according to a second embodiment of the invention is configured as a apparatus using an image processing circuit 30 which has a configuration illustrated in FIG. 5, in order to execute the AAM screen process as shown in FIG. 7, instead of the image processing circuit 20 mentioned above.

That is, the image processing circuit 30 used in the printing apparatus 10 according to the second embodiment includes an input raster buffer 31 capable of storing seven raster data. In the drawing, "raster 0" to "raster 6" represent raster data that is inputted seven to one times previous to the current raster data inputted at the current time, respectively.

An address counter 37 is a circuit operable to start a process for sequentially outputting addresses from 0 to 8191 whenever an input of raster data is newly started, in the same manner as the address counter 27. Additionally, in the same manner as the image processing circuit 20, an image processing circuit 30 is operable to periodically shift and record 56 bit data including the data (which are six 8-bit data except for the oldest 8-bit data) inputted for six times in the past and the data inputted at the current time from the input raster buffer 31 to addresses (the addresses of the data made to be outputted from the input raster buffer 31) determined by the address counter 37. For example, the data (pixel values) previously stored as a component of "raster P" (P=6 to 1) is stored as a component of "raster P−1", and the data currently inputted is stored as a component of "raster 6".

A cell buffer 33 is a buffer capable of storing N×M (in the embodiment, N=M=5) pixel values (pixel values per one cell).

A multiplexer 32 is a circuit for supplying the cell buffer 33 with the 40-bit data combined from five kinds of data which is designated by a cell selection circuit 38 in eight kinds of 8-bit data previously inputted.

The cell selection circuit 38 is a circuit including a counter for managing which sequence number of raster data (the head of raster data is a first raster data) is being processed, and a circuit operable to be synchronous to the address counter 37.

On the basis of the counter value, when inputting "4·k+1"-th raster data (which corresponds to "k·(N−1)+1"-th raster data in Claims 4 and 5), the cell selection circuit 38 is operable to control the multiplexer 32 so as to output the 40-bit data combined from raster data previously inputted and "4·(k−1)+1"-th to "4·k"-th raster data (which corresponds to "(k−1)·(N−1)+1"-th to "k·(N−1)"-th raster data in Claims 4 and 5) stored in the input raster buffer 31. When inputting any other raster data other than the "4·(k−1)+1"-th raster data, the cell selection circuit 38 is operable to control the multiplexer 32 so as to output the 40-bit data combined from "4·(k−1)+1"-th to "4·k+1"-th raster data stored in the input raster buffer 31.

When inputting "4·k+L"-th (L=1 to 4) raster data, the cell selection circuit 38 is operable to control cell buffers 231 to 234 so as to stores the pixel values of each cell (see FIG. 3) which includes a L-th cell in the order of the X direction and which arranged at intervals of three cells in the X direction.

An AAM screen processing circuit 34 is the same circuit as the AAM screen processing circuit 24L, and a recording circuit 35 is operable to record the data outputted from each AAM screen processing circuit 34 into a proper position of an output raster buffer 36. The image processing circuit 30 is configured as a circuit for outputting the data (the data sorted through the recording circuit 35 in the manner of using the output raster buffer 36), which is recorded into the output raster buffer 36 by the recording circuit 35, as a final output.

Figure 6:
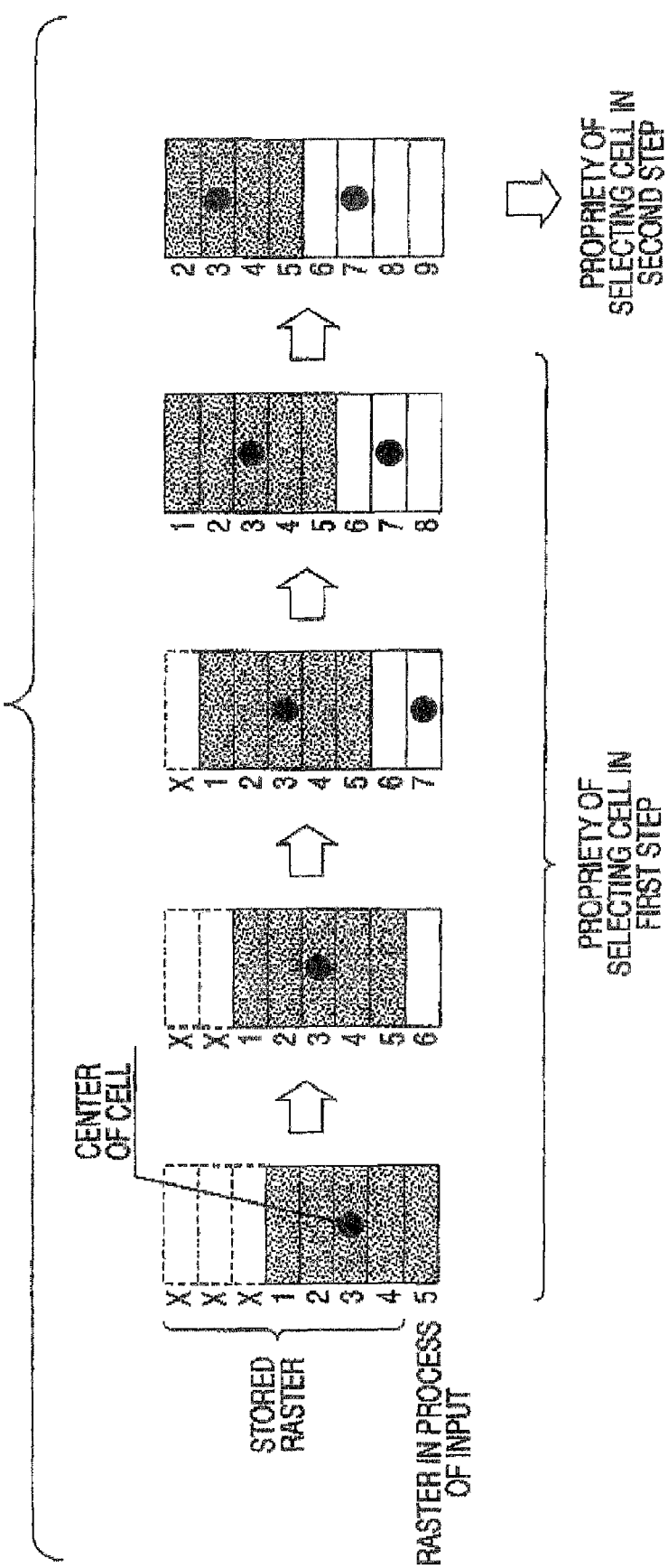
FIG. 6 is a diagram illustrating an operation of the image processing circuit according to the second embodiment.

As described above, instead of having a plurality of screen processing circuits, the image processing circuit 30 included in the printing apparatus 10 according to the embodiment has the input raster buffer 31 capable of storing much more raster data. Hence, the image processing circuit 30 is configured as a circuit operable to execute calculation processes for cells in a k-th step, even when inputting "4·k+2"-th to "4·k+4"-th raster data, as schematically illustrated in FIG. 6. Accordingly, the image processing circuit 30 is also configured as a circuit capable of executing a screen processes (i.e. the processes including a process for calculating the center of gravity position of gradation in cells) such as the AAM screen process at a speed without any problem in practical use. In addition, the printing apparatus 10 using the image processing circuit 80 according to the second embodiment can be manufactured so as to be configured without a CPU of high performance.

Modified Embodiment

The aforementioned printing apparatus 10 and the image processing circuits 20 and 30 may be modified to various forms. For example, the image processing circuits 20 and 30 may be changed to a circuit having a different vertical shift amount or a different cell size with that of the circuit mentioned above, or a circuit capable of specifying a vertical shift amount or a cell size. Additionally, as might be expected, the printing apparatus 10 of the embodiments is a printer, but it may be possible to embody a printing apparatus (a multifunction printer, a facsimile, or the like) other than the printer, by using a technique (image processing circuits 20 and 80) applied to the printing apparatus 10.

What is claimed is:

1. An image processing circuit for generating processed image data from processing object image data indicative of a processing object image which virtually has a plurality of cells each of which includes a set of M×N pixels in which M pixels are arranged in the X direction and N pixels are arranged in Y direction, the cells are arranged in a plurality of steps and are shifted each other by Dx pixels in the X direction and by Dy pixels in the Y direction, the image processing circuit: comprising:
   an input raster buffer operable to store (N−1) raster data each of which includes pixel values regarding pixels aligned on one line in the X direction in the processing object image;

a data updating circuit to which each of the pixel values included in the raster data is sequentially inputted, the data updating circuit operable to update the raster data in the input raster buffer so as to sequentially replace each of the pixel values in the oldest stored raster data by each of the inputted pixel values;

a plurality of cell buffers, each of which is operable to store M×N pixel values regarding one of the cells;

a plurality of screen processing circuits, each of which is operable to generate and output partial data for the processed image data by executing a predetermined process for obtaining a center of gravity position of gradation values in the one of the cells from the M×N pixel values stored in one of the cell buffers; and a control circuit operable to execute a control process for sequentially storing pixel values regarding each of cells in k-th step into one of the cell buffers based on the raster data inputted in the data updating circuit and the raster data stored in the input raster buffer when "k·(N−1)+1"-th raster data is inputted to the data updating circuit.

2. An image processing circuit for generating processed image data from processing object image data indicative of a processing object image which virtually has a plurality of cells each of which includes a set of M×N pixels in which M pixels are arranged in the X direction and N pixels are arranged in Y direction, the cells are arranged in a plurality of steps and are shifted each other by Dx pixels in the X direction and by (N−1) pixels in the Y direction, the image processing circuit comprising:

an input raster buffer operable to store (N−1) raster data each of which includes pixel values regarding pixels aligned on one line in the X direction in the processing object image;

a data updating circuit to which each of the pixel values included in the raster data is sequentially inputted, the data updating circuit operable to update the raster data in the input raster buffer so as to sequentially replace each of the pixel values in the oldest stored raster data by each of the inputted pixel values;

(N−1) cell buffers, each of which is operable to store M×N pixel values regarding one of the cells;

(N−1) screen processing circuits, each of which is operable to generate and output partial data for the processed image data by executing a predetermined process for obtaining a center of gravity position of gradation values in the one of the cells from the M×N pixel values stored in one of the (N−1) cell buffers; and a control circuit operable to execute a control process for sequentially storing pixel values regarding each of cells in k-th step into one of the (N−1) cell buffers based on the raster data inputted in the data updating circuit and the raster data stored in the input raster buffer when "k·(N−1)+1"-th raster data is inputted to the data updating circuit.

3. The image processing circuit as set forth in claim 2, wherein the control process includes a process for storing pixel values regarding respective cells which include an L-th cell in the order of the X direction arranged into the L-th cell buffer (L=1 to N−1) and arranged at intervals of (N−2) cells in the X direction.

4. An image processing circuit for generating processed image data from processing object image data indicative of a processing object image which virtually has a plurality of cells each of which includes a set of M×N pixels in which M pixels are arranged in the X direction and N pixels are arranged in Y direction, the cells are arranged in a plurality of steps and are shifted each other by Dx pixels in the X direction and by Dy pixels in the Y direction, the image processing circuit comprising:

an input raster buffer operable to store (N+Dy−2) raster data each of which includes pixel values regarding pixels aligned on one line in the X direction in the processing object image;

a data updating circuit to which each of the pixel values included in the raster data is sequentially inputted, the data updating circuit operable to update the raster data in the input raster buffer so as to sequentially replace each of the pixel values in the oldest stored raster data by each of the inputted pixel values;

a cell buffer operable to store M×N pixel values regarding one of the cells;

a screen processing circuit operable to generate and output partial data for the processed image data by executing a predetermined process for obtaining a center of gravity position of gradation values in the one of the cells from the M×N pixel values stored in the cell buffer;

a control circuit operable to execute during a time period between a time when "k·(N−1)+1"-th raster data is inputted into the data updating circuit and a time when "k·(N−1)+2"-th raster data is inputted into the data updating circuit, a first control process for storing pixel values regarding some of cells in k-th step into the cell buffer based on the raster data inputted in the data updating circuit and the "(k−1)·(N−1)+1"-th raster data to "k·(N−1)"-th raster data stored in the input raster buffer, and a second control process for storing pixel values regarding the other of the cells in the k-th step into the cell buffer based on only the "(k−1)·(N−1)+1"-th raster data to "(k·(N−1)+1"-th raster data.

5. An image processing circuit for generating processed image data from processing object image data indicative of a processing object image which virtually has a plurality of cells each of which includes a set of M×N pixels in which M pixels are arranged in the X direction and N pixels are arranged in Y direction, the cells are arranged in a plurality of steps and are shifted each other by Dx pixels in the X direction and by (N−1) pixels ill the Y direction, the image processing circuit comprising:

an input raster buffer operable to store (2N−3) raster data each of which includes pixel values regarding pixels aligned on one line in the X direction in the processing object image;

a data updating circuit to which each of the pixel values included in the raster data is sequentially inputted, the data updating circuit operable to update the raster data in the input raster buffer so as to sequentially replace each of the pixel values in the oldest stored raster data by each of the inputted pixel values;

a cell buffer operable to store M×N pixel values regarding one of the cells;

a screen processing circuit operable to generate and output partial data for the processed image data by executing a predetermined process for obtaining a center of gravity position of gradation values in the one of the cells from the M×N pixel values stored in the cell buffer;

a control circuit operable to execute a first control process for storing pixel values regarding respective cells in k-th step, which are arranged at intervals of (N−2) cells in the X direction into the cell buffer based on the raster data inputted into the data updating circuit and the "(k−1)·(N−1)+1"-th raster data to "k·(N−1)"-th raster data stored in the input raster buffer in a case where "k·(N−1)+1"-th raster data is inputted into the data updating circuit, and a second control process for storing pixel values regarding the other respective cells in the k-th step into the cell buffer based on only "$(k-1)\cdot(N-1)+1$"-th raster data to "$k\cdot(N-1)+1$"-th raster data stored in the input raster buffer in a case where "$k\cdot(N-1)+2$"-th raster data to "$k\cdot(N-1)+N-1$"-th raster data are inputted into the data updating circuit.

6. The image processing circuit as set forth in claim 5, wherein:
   the first control process executed by the control circuit includes a process for storing the pixel values for respective cells including a first cell in the order of the X direction into the cell buffer; and
   the second control process executed by the control circuit includes a process for storing the pixel values for respective cells including a L-th cell in the order of the X direction into the cell buffer when "$k\cdot(N-1)+L$"-th raster data (L=2 to N−1) is inputted into the data updating circuit.

7. A printing apparatus comprising the image processing circuit as set forth in claim 1, wherein the printing apparatus performs printing based on the processed image data obtained by inputting the processing object image data into the image processing circuit.

8. A printing apparatus comprising the image processing circuit as set forth in claim 2, wherein the printing apparatus performs printing based on the processed image data obtained by inputting the processing object image data into the image processing circuit.

9. A printing apparatus comprising the image processing circuit as set forth in claim 4, wherein the printing apparatus performs printing based on the processed image data obtained by inputting the processing object image data into the image processing circuit.

10. A printing apparatus comprising the image processing circuit as set forth in claim 5, wherein the printing apparatus performs printing based on the processed image data obtained by inputting the processing object image data into the image processing circuit.

* * * * *